United States Patent
Andryukov et al.

(10) Patent No.: US 11,814,161 B2
(45) Date of Patent: Nov. 14, 2023

(54) SPRING-INTEGRATED ROTORS

(71) Applicant: Aurora Flight Sciences Corporation, Manassas, VA (US)

(72) Inventors: Alexander Andryukov, Gainesville, VA (US); Lauren Butt, Ashburn, VA (US); Derek Jackson, Fairfax, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 123 days.

(21) Appl. No.: 17/378,450

(22) Filed: Jul. 16, 2021

(65) Prior Publication Data
US 2023/0012688 A1    Jan. 19, 2023

(51) Int. Cl.
*B64C 27/00* (2006.01)
*B64C 27/52* (2006.01)
*B64C 27/35* (2006.01)

(52) U.S. Cl.
CPC ............ *B64C 27/001* (2013.01); *B64C 27/35* (2013.01); *B64C 27/52* (2013.01); *B64C 2027/002* (2013.01)

(58) Field of Classification Search
CPC ....... B64C 27/001; B64C 27/35; B64C 27/52; B64C 227/002; B64C 27/008
See application file for complete search history.

(56) References Cited

U.S. PATENT DOCUMENTS

2010/0296930 A1* 11/2010 Girard ................... B64C 27/001 416/144
2019/0100301 A1* 4/2019 Hu .......................... B64U 50/19

OTHER PUBLICATIONS

Website, "Alta X—Freefly System," https://freeflysystems.com/alta-x, 14 pages, last accessed Feb. 1, 2022, Freefly Systems.

* cited by examiner

*Primary Examiner* — Philip J Bonzell
*Assistant Examiner* — Ashesh Dangol
(74) *Attorney, Agent, or Firm* — HANLEY, FLIGHT & ZIMMERMAN

(57) ABSTRACT

Spring-integrated rotors are disclosed. A disclosed example apparatus includes a bracket defining a first rotational axis and coupled to a motor for rotating the bracket about the first rotational axis, a pivot body defining a second rotational axis extending along a direction different than the first rotational axis, the pivot body coupled to the bracket for rotation about the second rotational axis, and at least one spring device positioned at the bracket, the at least one spring device urging the pivot body toward a central position when the bracket is rotating.

20 Claims, 10 Drawing Sheets

SPRING-INTEGRATED ROTORS

FIELD OF THE DISCLOSURE

This disclosure relates generally to aircraft and, more particularly, to spring-integrated rotors.

BACKGROUND

Rotors are typically implemented to provide lift for some types of aircraft (i.e., rotorcraft). The rotors typically include propeller blades that radially extend from a hub. For an aircraft, rotation of the rotors causes the propeller blades to interact with air surrounding the aircraft, thereby generating lift for the aircraft. In some cases, flight of the aircraft can be controlled by varying a rotational speed of the rotors and/or shutting off one or more of the rotors during flight.

SUMMARY

An example apparatus disclosed herein includes a bracket defining a first rotational axis and coupled to a motor for rotating the bracket about the first rotational axis. A pivot body defines a second rotational axis extending along a direction different than the first rotational axis, the pivot body coupled to the bracket for rotation about the second rotational axis. At least one spring device is disposed between the bracket and the pivot body for urging the pivot body toward a central position when the bracket is rotating.

An example method disclosed herein includes providing a flight input to control an aircraft, and causing, based on the flight input, an apparatus and a rotor coupled to the apparatus to rotate together about a first rotational axis, the apparatus including a bracket operatively coupled to a motor of the aircraft, a pivot body rotationally coupled to the bracket and defining a second rotational axis extending in a direction different than the first rotational axis, and at least one spring device disposed between the bracket and the pivot body for urging the pivot body toward a central position about the second rotational axis when the apparatus is rotating.

An example method for reducing loading on propeller blades of a rotor-driven vehicle includes driving a rotor of the rotor-driven vehicle about a first axis via a motor, rotating the propeller blades in response to driving the motor, biasing the propeller blades toward a central position relative to the first axis, in response to external loading imparted during flight, tilting the propeller blades about a second axis as the propeller blades rotate about the first axis, the second axis extending in a direction different than the first axis, and returning the propeller blades to the central position as the external loading dissipates.

Figure 1:
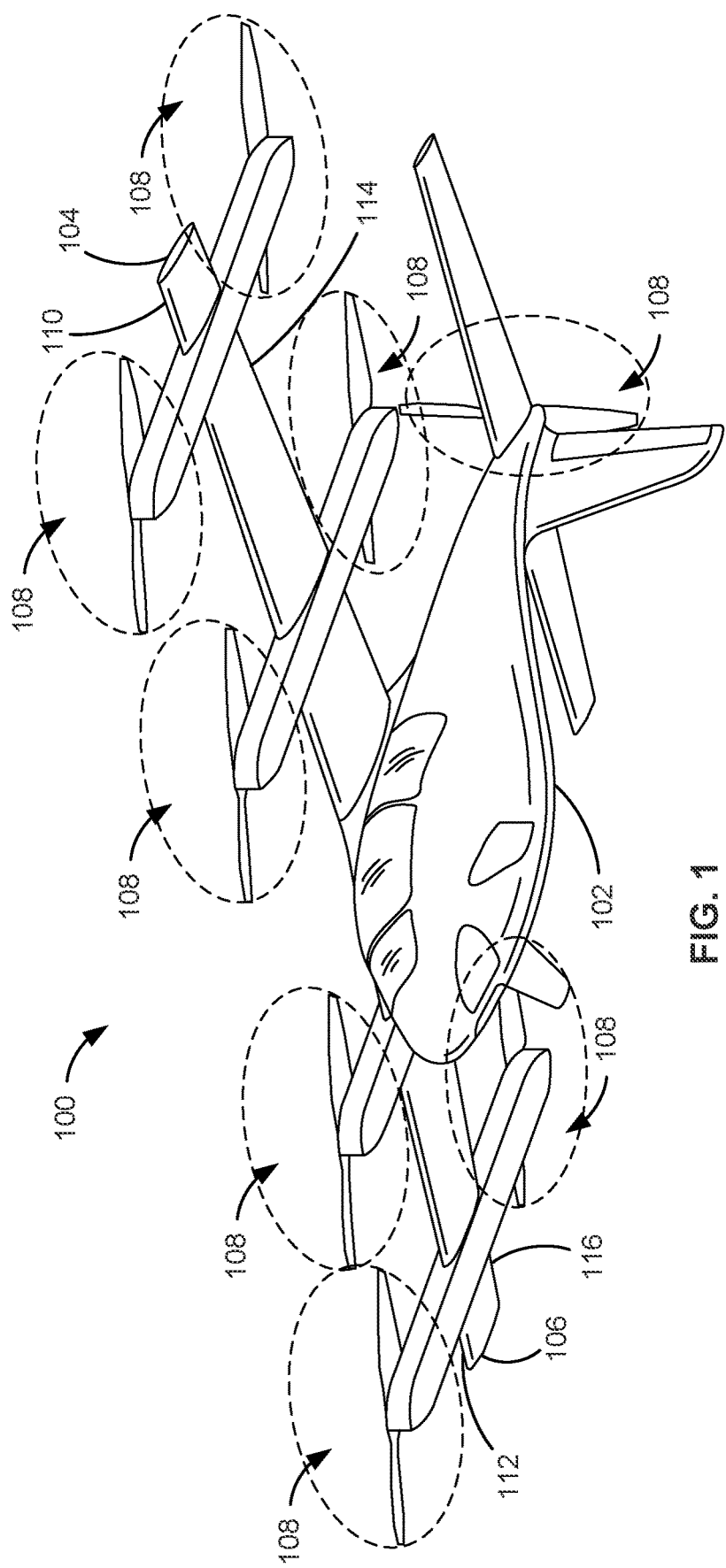
FIG. 1 illustrates an example aircraft in which examples disclosed herein can be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Spring-integrated rotors are disclosed. Rotors, including one or more propeller blades, are typically implemented on aircraft. In operation, a motor is usually operatively coupled to the rotor to control a rotation speed thereof. In some cases, the motor is implemented as a variable speed motor to control the rotation speed. For example, the rotor may be slowed down and/or shut off during flight. As a result, vibratory loads generated by rotation of the rotor may come into resonance with a natural frequency of the rotor. Such resonance may occur proximate a high forward flight airspeed, and can result in an increase in rotor loads on the motor and/or support structures associated with the rotor. The aforementioned rotor loads can result in damage to the motor and, thus, reduce an operational life of the motor and/or the associated support structures of the rotor. To mitigate these effects, the support structures of the rotor can be sized to withstand the rotor loads, thereby increasing a weight and/or size of the aircraft.

Examples disclosed herein implement torsional springs that work in tandem with a rotor assembly to reduce vibratory loads generated during flight of an aircraft. An example spring-integrated rotor disclosed herein includes a bracket having example first and second support walls (e.g., flange walls) that define corresponding support surfaces, where the bracket defines a first rotational axis. According to examples disclosed herein, a shaft extends between the first and second support walls along a direction of a second rotational axis. In examples disclosed herein, the second rotational axis extends along a direction that is different from the first rotational axis. In some examples disclosed herein, the second rotational axis is perpendicular to the first rotational axis. In examples disclosed herein, an example pivot body is positioned between the first and second support walls, and the shaft is disposed in the pivot body such that the pivot body rotates about the second rotational axis. According to examples disclosed herein, a first example torsional spring is coupled between the first support wall and the pivot body, and a second example torsional spring is coupled between the second support wall and the pivot body.

According to examples disclosed herein, by enabling rotation of the pivot body about the first and second rotational axes, the spring-integrated rotor reduces vibratory loads applied on the motor. Additionally, the first and second torsional springs, when placed at certain lines of action, can couple the flap and pitching motion such that deflections of the spring-integrated rotor relative to the second rotational axis can be reduced, thereby reducing damage to the spring-integrated rotor caused by the vibratory loads. Advantageously, as a result of implementing the first and second torsional springs, a weight and/or size of the spring-integrated rotor and, thus, an aircraft can be reduced. Further, examples disclosed herein can have a relatively long operational life.

FIG. 1 illustrates an example aircraft 100 in which examples disclosed herein can be implemented. In this example, the aircraft 100 is an unmanned aerial vehicle (UAV). In other examples, the aircraft 100 can be manned. In this example, the aircraft 100 is a rotor-driven vehicle. In the illustrated example of FIG. 1, the aircraft 100 includes an example fuselage 102, an example first wing 104 coupled to the fuselage 102, and an example second wing 106 coupled to the fuselage 102. In this example, each of the first and second wings 104, 106 includes example rotors 108 operatively coupled thereto. For example, each of the first and second wings 104, 106 includes four of the rotors 108. In the illustrated example, two of the four rotors 108 are positioned proximate each of two front edges 110, 112 of the respective first and second wings 104, 106, and two of the four rotors 108 are positioned proximate each of two rear edges 114, 116 of the respective first and second wings 104, 106. However, any appropriate number of the rotors 108 can be implemented instead.

In the illustrated example of FIG. 1, the rotors 108 are powered via variable speed motors. For example, during forward flight of the aircraft 100, one or more of the rotors 108 may be slowed down (e.g., shut off). As rotation speed of the rotors 108 decreases, the rotation speed may reach and/or cross a critical speed at which a resonance may occur. The resonance can generate vibratory loads on the rotors 108 and, in turn, affect operation of the rotors 108. To mitigate and/or reduce potential damage to the rotors 108, structural components of the rotors 108 can be sized to withstand such vibratory loads. Additionally or alternatively, as will be discussed in greater detail below in connection with FIGS. 2-8, springs can be implemented on the rotors 108 to reduce, eliminate, and/or absorb the vibratory loads.

Figure 2:
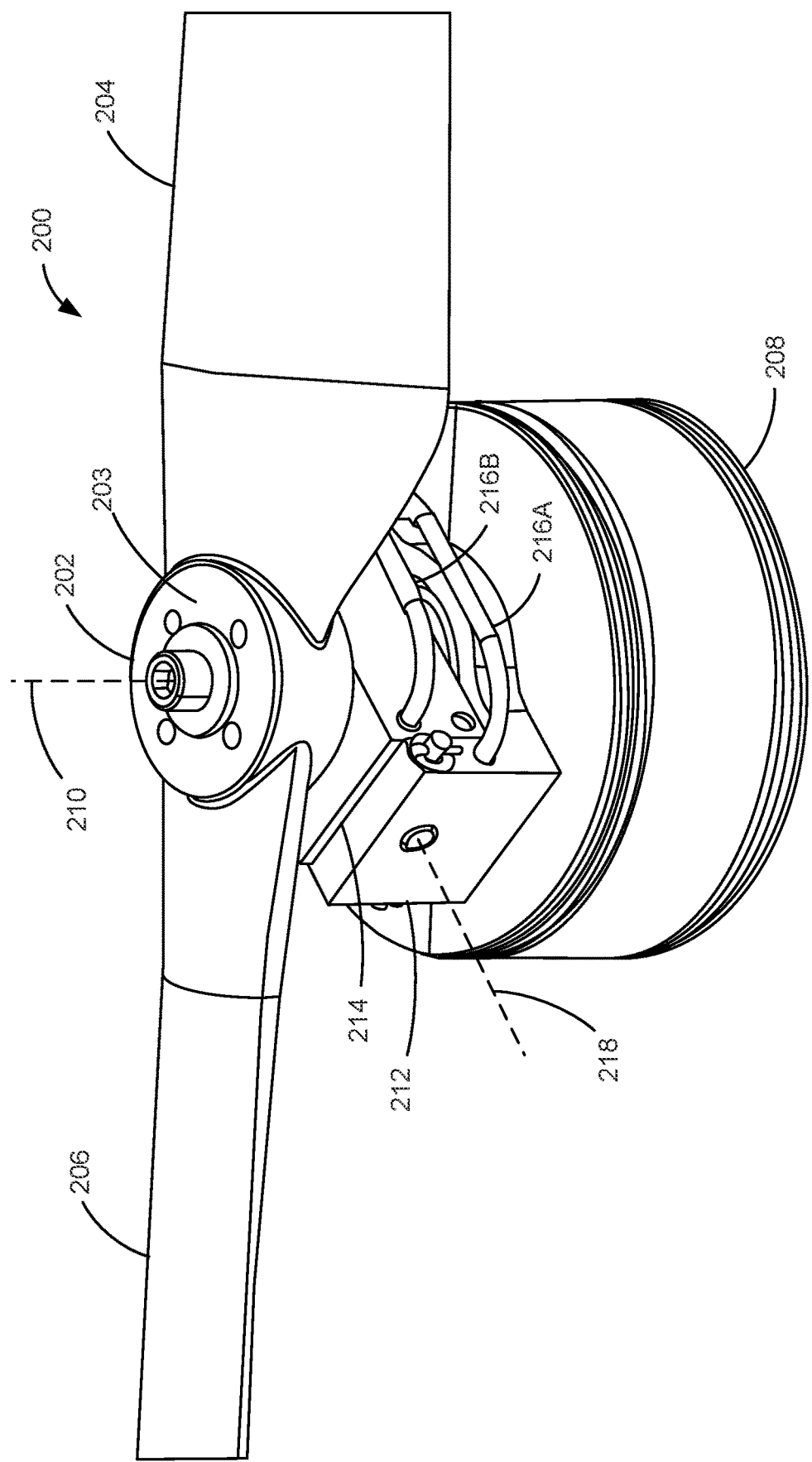
FIG. 2 illustrates an example spring-integrated rotor in accordance with teachings of this disclosure.

FIG. 2 illustrates a portion of an example spring-integrated rotor 200 in accordance with teachings of this disclosure. The example spring-integrated rotor 200 can be implemented on the aircraft 100 of FIG. 1 and/or the rotors 108 of FIG. 1. In the illustrated example of FIG. 2, the spring-integrated rotor 200 includes an example hub (e.g., rotor hub) 202 including an example upper surface 203 and example propeller blades 204, 206 coupled to the hub 202. While two of the propeller blades 204, 206 are shown in this example, any appropriate number of propeller blades 204, 206 can be used instead. In the illustrated example, the hub 202 is operatively coupled to an example motor (e.g., variable speed motor) 208 that rotates the hub 202 and, in turn, the propeller blades 204, 206 about a first example rotational axis 210. In this example, a bracket 212, which is generally u-shaped, and a pivot body (e.g., a pivot block) 214 are positioned between the hub 202 and the motor 208. In particular, the pivot body 214 is positioned within and/or supported by the bracket 212. Furthermore, example first and second torsional springs 216A, 216B are coupled between the bracket 212 and the pivot body 214. In this example, at least one of the bracket 212 or the pivot body 214 may be at least partially composed of polyether ether ketone (PEEK), and the first and second torsional springs 216A, 216B are steel. In other examples, one or more different materials can be implemented instead.

In operation, the bracket 212 and the pivot body 214 rotate with the hub 202 about the first rotational axis 210 when the motor 208 is driven. In this example, the motor 208 is a variable speed motor, for which rotation speed and a direction of rotation of the motor 208 are controllable via a control system communicatively coupled thereto. In some examples, the control system is positioned in the fuselage 102 of FIG. 1. In some such examples, the control system can shut off and/or slow down the motor 208 during operation of the aircraft 100, which can result in vibratory loads applied onto the hub 202 and the first and second propeller blades 204, 206.

In this example, the propeller blades 204, 206 are in a central position relative to the first rotational axis 210, such that the pivot body 214 is substantially normal to the bracket 212 as shown in FIG. 2. In some examples, the pivot body 214 can pivot relative to the bracket 212 about a second rotational axis 218, where the second rotational axis 218 extends along a different direction than the first rotational axis 210 (e.g., the second rotational axis 218 is substantially perpendicular to the first rotational axis 210). The hub 202 of the illustrated example is movably coupled to the pivot body 214 such that the hub 202 and the propeller blades 204, 206 can pivot with respect to the pivot body 214. As such, when the vibratory loads cause the hub 202 and the pivot body 214 to pivot relative to the bracket 212, the first and second torsional springs 216A, 216B can dampen and/or reduce the vibratory loads to return the propeller blades 204, 206 to the central position. By reducing the vibratory loads, the first and second torsional springs 216A, 216B can prevent and/or reduce premature wear to the spring-integrated rotor 200.

Figure 3:
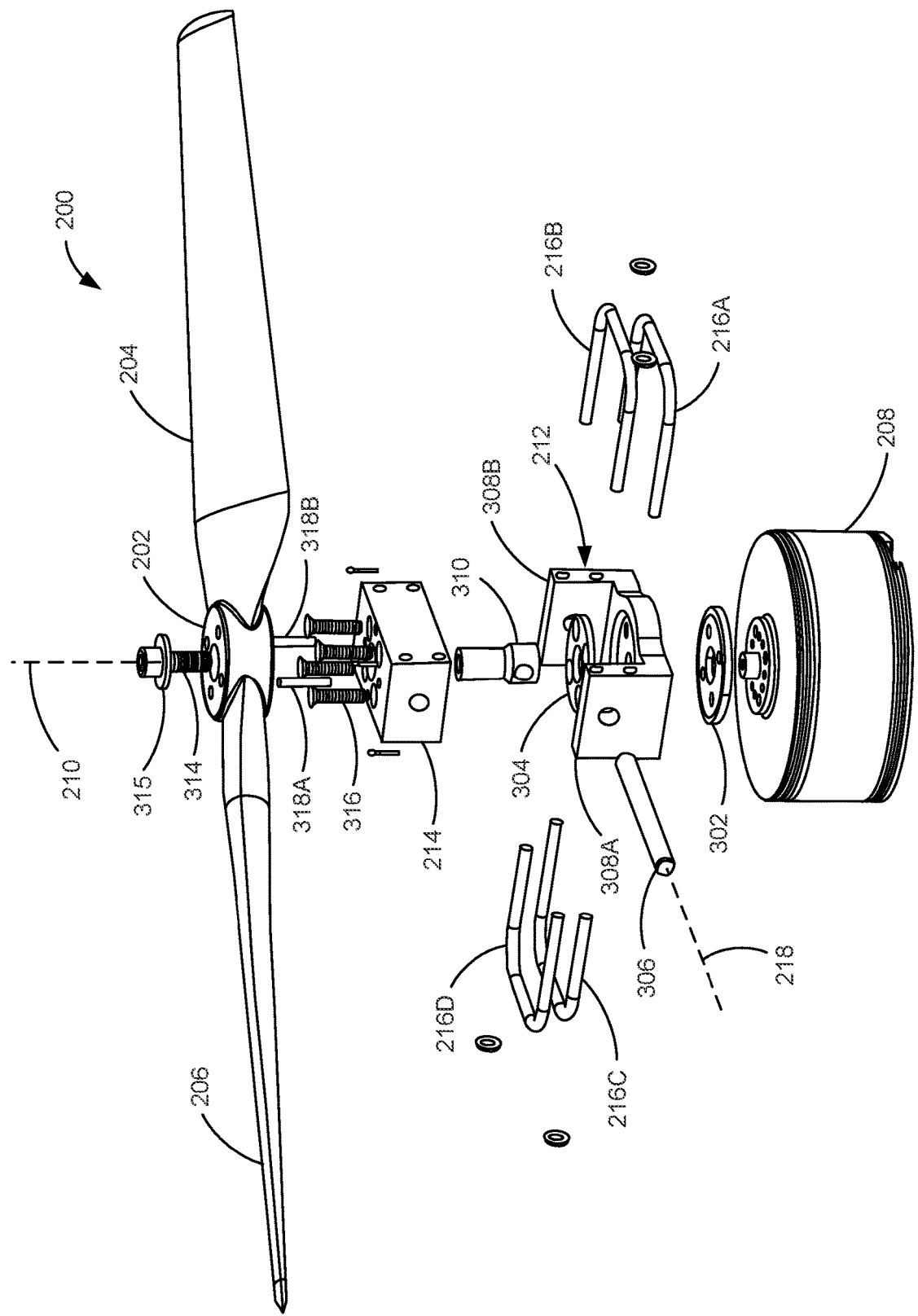
FIG. 3 is an exploded view of the example spring-integrated rotor of FIG. 2.

FIG. 3 is an exploded view of the spring-integrated rotor 200 of FIG. 2. In the illustrated example of FIG. 3, the spring-integrated rotor 200 further includes example third and fourth torsional springs 216C, 216D coupled to the bracket 212 and the pivot body 214 at a side of the pivot body 214 opposite to that of the first and second torsional springs 216A, 216B. In this example, a washer (e.g., disc, ring) 302, which is implemented as a knurled washer in this example, is to be positioned between the motor 208 and the bracket 212. Further, a washer 304 is to be positioned at a top surface of the bracket 212 (in the view of FIG. 3).

In the illustrated example, an example longitudinal shaft (e.g., a first shaft) 306 extends between example first and second support walls (e.g., flange walls, support walls defining support surfaces, etc.) 308A, 308B of the bracket 212, and an example transverse shaft (e.g., a second shaft) 310 is disposed in the pivot body 214 perpendicular to and intersecting the longitudinal shaft 306. Further, the pivot body 214 is coupled (e.g., rotatably coupled, movable coupled, etc.) to the bracket 212, and positioned between the first and second support walls 308A, 308B. In particular, the longitudinal shaft 306 extends through corresponding openings (e.g., apertures) of the bracket 212, the pivot body 214, and the transverse shaft 310 to rotationally couple the pivot body 214 and the transverse shaft 310 to the bracket 212. In some examples, the openings are substantially aligned, and the longitudinal shaft 306 defines the aforementioned second rotational axis 218. As a result, the pivot body 214 and the transverse shaft 310 can rotate and/or pivot about the second rotational axis 218.

According to the illustrated example of FIG. 3, the hub 202 is couplable to the transverse shaft 310 via a screw 314 centrally disposed in the hub 202 and disposed in a central aperture of the transverse shaft 310. In some examples, a washer 315 is implemented with the screw 314 and positioned adjacent a top surface of the hub 202. Furthermore, the hub 202 is coupled to the pivot body 214 via screws 316 disposed in the hub 202. In this example, the screws 316 are evenly spaced (e.g., rotationally spaced) around the screw 314. Although four of the screws 316 are shown in this example, any appropriate number and/or spacing of the screws 316 can be implemented instead. In some examples, the screws 316 are not utilized. Additionally, while screws are used in this example, any other type of fasteners (e.g., bolts, chemical fasteners, etc.) may be used instead. In this example, pins (e.g., dowel pins) 318A, 318B are operatively coupled between the hub 202 and the pivot body 214. In some examples, the pins 318A, 318B facilitate control of an angle (e.g., a delta-3 angle) between the propeller blades 204, 206 and the torsional springs 216A-216D. As such, the pins 318A, 318B enable variation of a flap-pitch coupling of the spring-integrated rotor 200, which can result in a reduction of unintended deflection of the propeller blades 204, 206 during flight of the aircraft 100. In some examples, the pins 318A, 318B and/or the screws 316 transfer torque from the motor 208 to the first and second propeller blades 204, 206.

In this example, the first and fourth torsional springs 216A, 216D extend between the first support wall 308A and the pivot body 214, and the second and third torsional springs 216B, 216C extend between the second support wall 308B and the pivot body 214. Furthermore, the second and third torsional springs 216B, 216C are coupled to the pivot body 214 at a first end proximate the first support wall 308A, and the first and fourth torsional springs 216A, 216D are coupled to the pivot body 214 at a second end proximate the second support wall 308B. In this example, the torsional springs 216A, 216B, 216C, 216D are generally u-shaped. For example, each of the torsional springs 216A, 216B, 216C, 216D includes first and second bent portions (e.g., bent ends) and a straight portion extending therebetween. In other examples, the torsional springs 216A, 216B, 216C, 216D are curved between the first and second bent ends. However, any appropriate shape of the torsional springs 216A, 216B, 216C, 216D can be implemented instead. In some examples, the torsional springs 216A, 216B, 216C, 216D dampen vibratory loads to reduce oscillation of the pivot body 214 about the second rotational axis 218.

Figure 4:
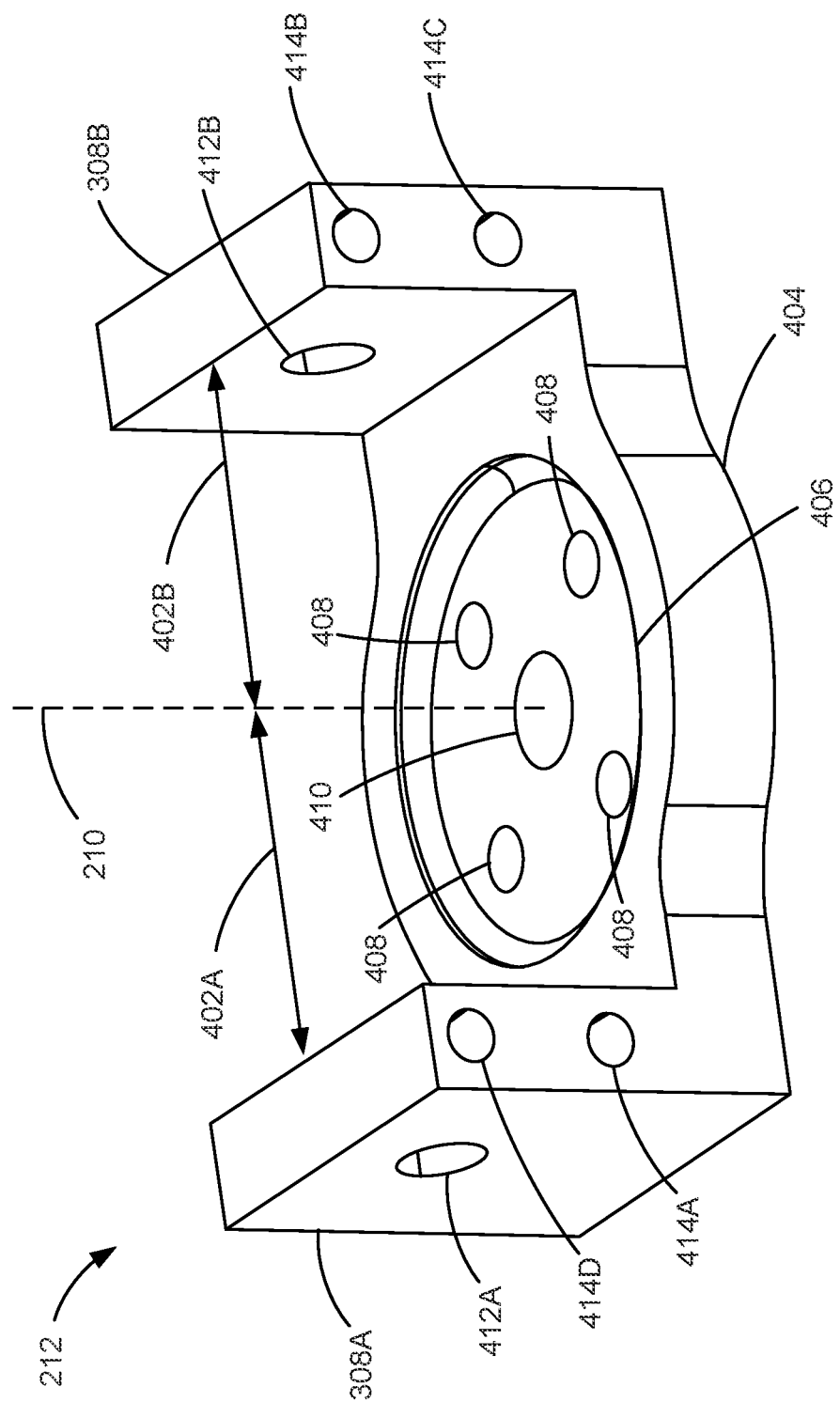
FIG. 4 is a detailed view of an example bracket of the example spring-integrated rotor shown in FIGS. 2 and 3.

FIG. 4 is a detailed view of the example bracket 212 of the example spring-integrated rotor 200 shown in FIGS. 2 and 3. In the illustrated example of FIG. 4, the bracket 212 includes the first and second support walls 308A, 308B at first and second distances 402A, 402B, respectively, from the first rotational axis 210. In this example, the first and second distances 402A, 402B are substantially the same. In other examples, the first and second distances may be different. The bracket 212 includes an example base 404 between the first and second support walls 308A, 308B. The example base 404 is operatively couplable to the motor 208 and/or to the washer 302 of FIG. 3. The base 404 of the illustrated example includes an example circular recess 406 in which the washer 304 of FIG. 3 can be positioned. In this example, the bracket 212, the motor 208, the washer 302, and the washer 304 can be coupled together with fasteners (e.g., bolts, screws, etc.) that extend through base apertures 408 of the aforementioned circular recess 406. In this example, four of the base apertures 408 are evenly spaced around a central base aperture 410, where the central base aperture 410 is substantially coaxially aligned with the first rotational axis 210. In other examples, a different number of the base apertures 408 can be implemented instead. In this example, the washers 302, 304 reduce stress from the fasteners on the base 404. In some examples, the bracket 212 is at least partially composed steel and/or aluminum, and the washers 302, 304 are not utilized. In some such examples, bushings may be implemented in the base apertures 408, where the bushings may be a different material (e.g., PEEK, bronze, etc.) from that of the bracket 212.

In this example, the first and second support walls 308A, 308B include example first and second shaft apertures 412A, 412B, respectively, to receive the longitudinal shaft 306 of FIGS. 2 and 3. The first and second support walls 308A, 308B further include spring apertures 414A, 414B, 414C, 414D, which can receive at least and/or couple to portions of the torsional springs 216A, 216B, 216C, 216D. In this example, the spring apertures 414A, 414B, 414C, 414D are substantially perpendicular (e.g., perpendicular within five degrees) to the example shaft apertures 412A, 412B. While four of the spring apertures 414A, 414B, 414C, 414D are shown in the example of FIG. 4, any appropriate number of the spring apertures 414A, 414B, 414C, 414D can be implemented instead.

Figure 5:
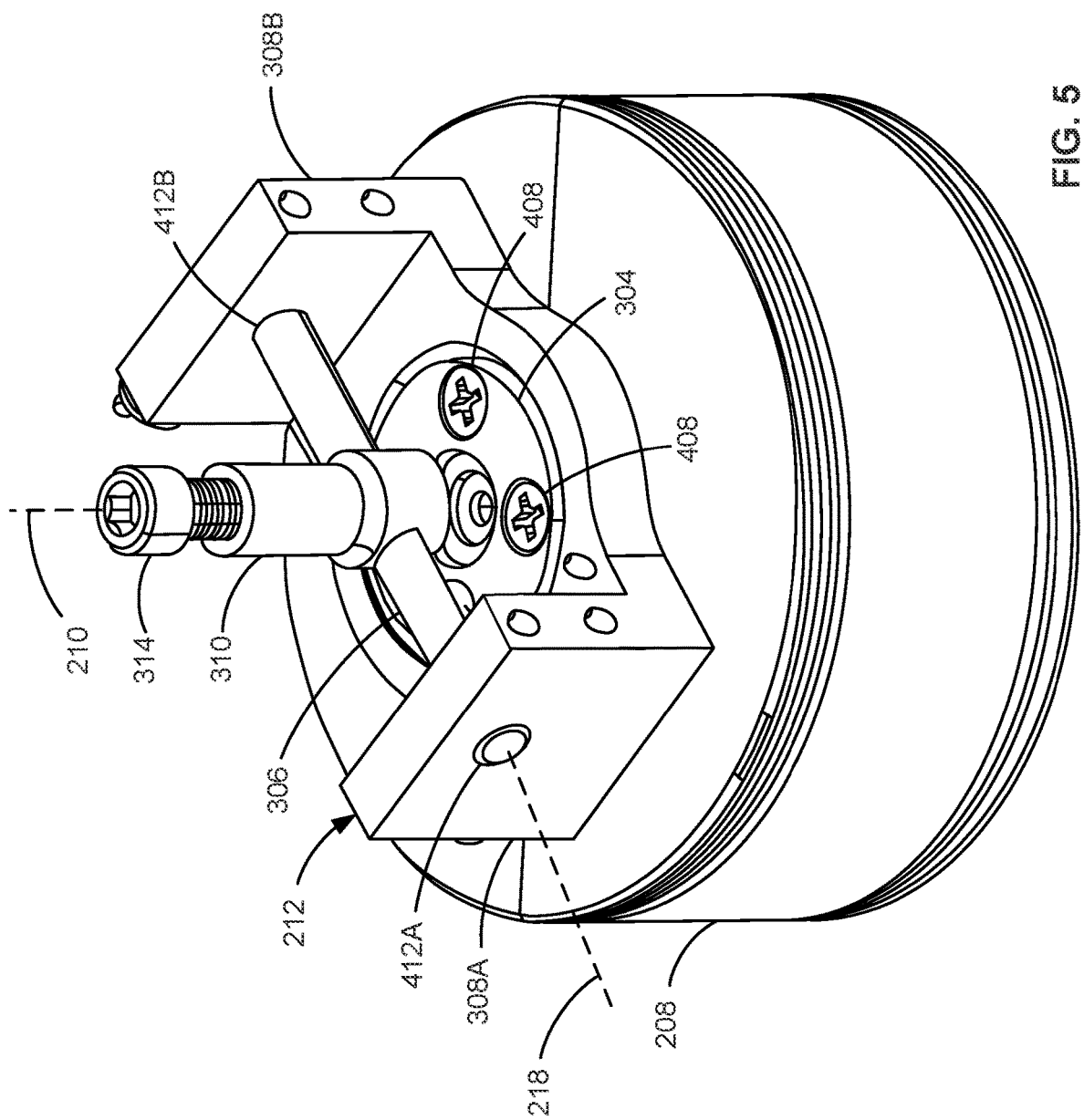
FIG. 5 illustrates the example bracket of FIG. 4 coupled to an example motor of the spring-integrated rotor shown in FIGS. 2 and 3.

FIG. 5 illustrates the example bracket 212 coupled to the example motor 208 of the spring-integrated rotor 200 shown in FIGS. 2 and 3. In the illustrated example of FIG. 5, the washer 304 and the bracket 212 are coupled to the motor 208 via fasteners (e.g., screws) that extend through the example base apertures 408. The longitudinal shaft 306 is disposed in the first and second shaft apertures 412A, 412B and extends longitudinally between the first and second support walls 308A, 308B. Furthermore, the example transverse shaft 310 is rotationally coupled to the longitudinal shaft 306, such that the transverse shaft 310 can rotate about the second rotational axis 218 defined by the longitudinal shaft 306. Furthermore, when the motor 208 is operated, the bracket 212 along with the longitudinal and transverse shafts 306, 310 rotate about the first rotational axis 210. In this example, the screw 314 is disposed in the transverse shaft 310, where the screw 314 and the transverse shaft 310 are substantially aligned with the first rotational axis 210.

Figure 6:
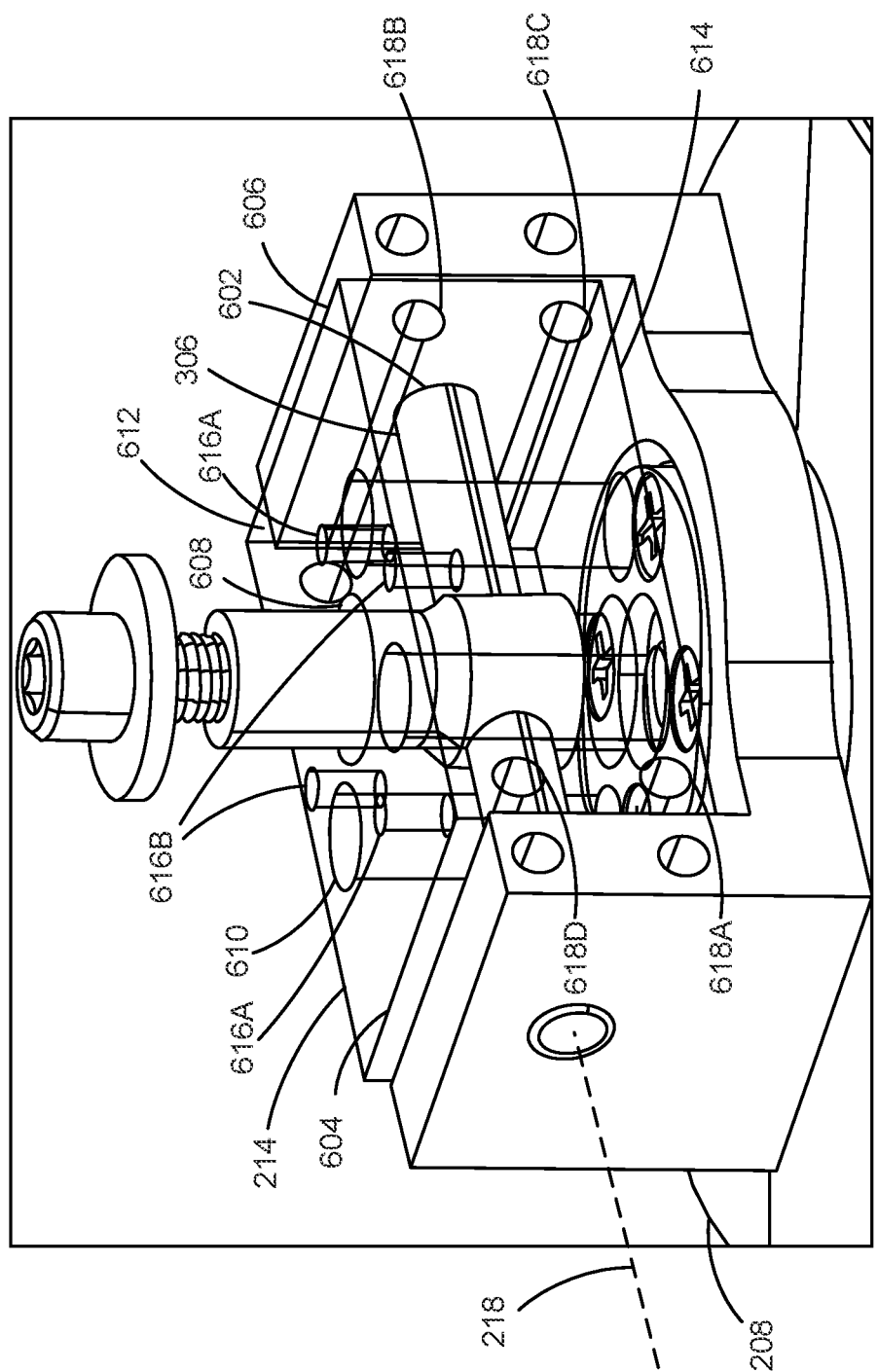
FIG. 6 is a partial transparent perspective view of an example pivot body that can be implemented in examples disclosed herein.

FIG. 6 is a partial transparent perspective view of the example pivot body 214. In the illustrated example, the longitudinal shaft 306 is disposed in an example longitudinal opening 602 that passes through the pivot body 214. The longitudinal opening 602 of the pivot body 214 extends between a first longitudinal end 604 and a second longitudinal end 606 of the pivot body 214. Furthermore, the transverse shaft 310 is disposed in an example transverse opening 608 through the pivot body 214. In the illustrated example of FIG. 6, the pivot body 214 further includes example screw openings 610 extending through the pivot body 214 between a top surface 612 and a bottom surface 614 of the pivot body 214. In particular, the screws 316 of FIG. 3 can be disposed in the screw openings 610 to couple the hub 202 of FIG. 3 to the pivot body 214.

In the illustrated example, the pivot body 214 includes example pin openings 616A, 616B extending partially inward into the pivot body 214 from the top surface 612. The pin openings 616A, 616B can receive the pins 318A, 318B of FIG. 3 to tiltably couple the hub 202 of FIGS. 2 and/or 3 to the pivot body 214. In some examples, the pin openings 616A, 616B are angled relative to the top surface 612, and the pins 318A, 318B are implemented to adjust a delta-3 angle between the upper surface 203 of the hub 202 and the top surface 612 of the pivot body 214 based on an angle of the pin openings 616A, 616B. While the pin openings 616A, 616B are the same in this example, at least one of the first pin openings 616A or the second pin openings 616B can be different. Furthermore, the pivot body 214 includes example block apertures 618A, 618B, 618C, 618D extending therethrough. In this example, the second and third block apertures 618B, 618C are located proximate the first longitudinal end 604 of the pivot body 214, and the first and fourth block apertures 618A, 618D are located proximate the second longitudinal end 606 of the pivot body 214. In some examples the block apertures 618A, 618B, 618C, 618D receive the torsional springs 216A, 216B, 216C, 216D of FIG. 3.

Figure 7:
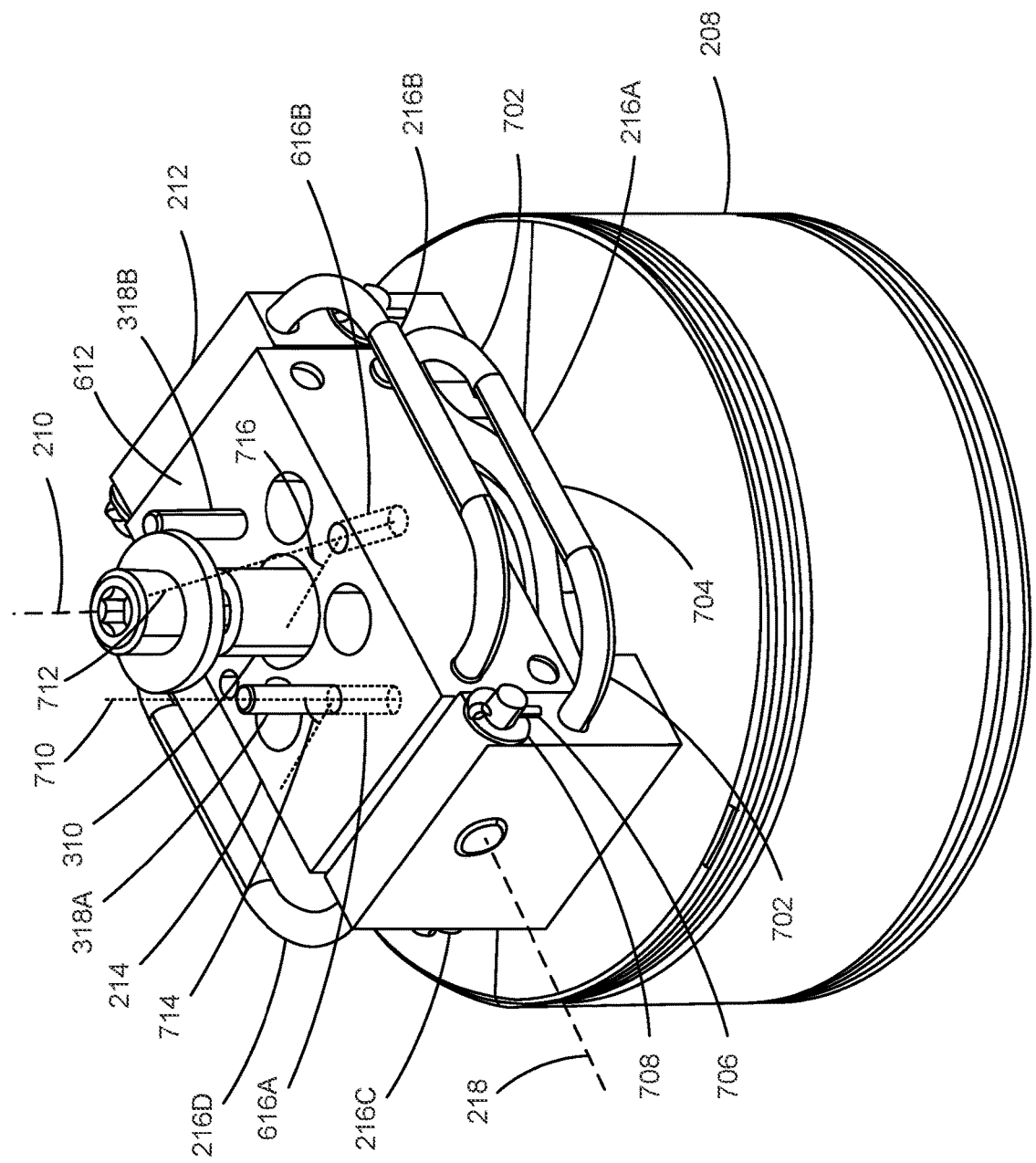
FIG. 7 illustrates example torsional springs that can be implemented in examples disclosed herein.

FIG. 7 illustrates the example torsional springs 216A, 216B, 216C, 216D that can be implemented in examples disclosed herein. In the illustrated example of FIG. 7, each of the torsional springs 216A, 216B, 216C, 216D is generally u-shaped. In other examples, a different shape of the torsional springs 216A, 216B, 216C, 216D may be implemented instead. In this example, the first torsional spring 216A includes example bent portions (e.g., bent ends) 702 and an example straight portion 704 therebetween. In some examples, a different bend radius of the bent portions 702 and/or a different length of the straight portion 704 may be used instead. While the torsional springs 216A, 216B, 216C, 216D have a similar shape in this example, at least two of the torsional springs 216A, 216B, 216C, 216D can be different from each other.

In the illustrated example, the torsional springs 216A, 216B, 216C, 216D extend between corresponding ones of the spring apertures 414A, 414B, 414C, 414D shown in FIG. 4 and corresponding ones of the block apertures 618A, 618B, 618C, 618D shown in FIG. 6. In this example, each of the torsional springs 216A, 216B, 216C, 216D extends at least partially into the pivot body 214, and extends fully through the corresponding one of the spring apertures 414A, 414B, 414C, 414D. For example, the fourth torsional spring 216D is placed into the fourth spring aperture 414D of the bracket 212, and an end of the fourth torsional spring 216D at least partially extends from a surface of the bracket 212. In this example, an example cotter pin 706 is disposed in the end of the fourth torsional spring 216D, and a washer 708 is implemented on the end of the fourth torsional spring 216D between the cotter pin 706 and the bracket 212. In this example, the cotter pin 706 prevents removal of the fourth torsional spring 216D from the bracket 212 (e.g., during operation of the motor 208). Accordingly, the washer 708 and the cotter pin 706 can similarly be implemented on any of the first, second, and third torsional springs 216A, 216B, 216C to prevent removal thereof from the bracket 212. In some examples, a different fastener (e.g., a circlip, a nut, etc.) can be implemented instead of the cotter pin 706.

In this example, the torsional springs 216A, 216B, 216C, 216D are implemented on the bracket 212 and the pivot body 214 in pairs. In other words, two of the torsional springs 216A, 216B, 216C, 216D are placed on one side of the pivot body 214 and/or the bracket 212. In some examples, an arrangement of the torsional springs 216A, 216B, 216C, 216D is mirrored across corresponding first and second sides of the pivot body 214. In some examples, at least two and up to eight of the torsional springs 216A, 216B, 216C, 216D may be used. In the illustrated example, each pair of the torsional springs 216A, 216B, 216C, 216D on opposite sides of the pivot body 214 provides opposing forces on the pivot body 214. For example, when the pivot body 214 pivots in a counterclockwise direction about the second rotational axis 218, the first and second torsional springs 216A, 216B are in tension, and the third and fourth torsional springs 216C, 216D are in compression. Conversely, when the pivot body 214 pivots in a clockwise direction about the second rotational axis 218, the first and second torsional springs 216A, 216B are in compression, and the third and fourth torsional springs 216C, 216D are in tension. As such, the torsional springs 216A, 216B, 216C, 216D generate forces on the pivot body 214 opposite and proportional to an angular displacement between the pivot body 214 and the bracket 212. Accordingly, the torsional springs 216A, 216B, 216C, 216D bias the pivot body 214 to a starting position in which the transverse shaft 310 is substantially aligned with the first rotational axis 210.

In the illustrated example of FIG. 7, the first pin openings 616A are oriented along a first example direction 710 relative to the top surface 612, and the second pin openings 616B are oriented along a second example direction 712 different from the first direction 710. In this example, the pins 318A, 318B are disposed in the first pin openings 616A. In other examples, the pins 318A, 318B can be disposed in the second pin openings 616B. In this example, when the pins 318A, 318B are inserted into the first openings 616A, a first example delta-3 angle 714 is defined between the upper surface 203 of the hub 202 of FIG. 2 and the top surface 612. In other examples, when the pins 318A, 318B are inserted into the second openings 616B, a second example delta-3 angle 716 is defined between the upper surface 203 and the top surface 612, where the second delta-3 angle 716 is different from the first delta-3 angle 714.

Figure 8:
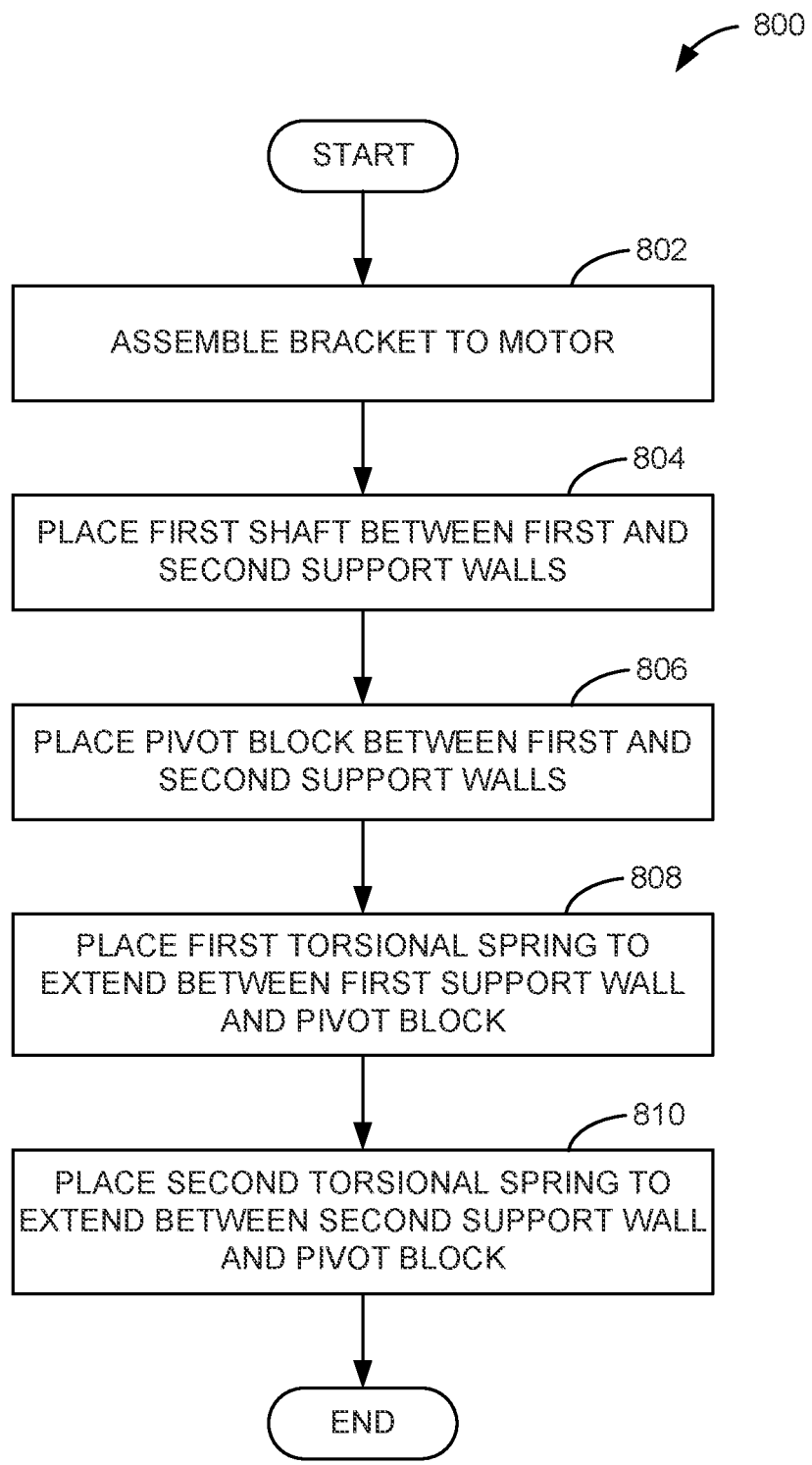
FIG. 8 is a flowchart representative of an example method to assemble examples disclosed herein.

FIG. 8 is a flowchart representative of an example method 800 to assemble examples disclosed herein. The example method 800 can be performed to assemble the spring-integrated rotor 200 shown in FIGS. 2 and 3. The example method 800 begins at block 802, at which the example bracket 212 of FIG. 3 is assembled (e.g., operatively coupled, mounted, etc.) to the example motor 208 of FIG. 3. In this example, the bracket 212 is assembled to the motor 208 using one or more fasteners disposed in the example base apertures 408 of FIG. 4.

At block 804, the example longitudinal shaft 306 of FIG. 3 is placed between the example first and second support walls 308A, 308B. For example, the longitudinal shaft 306 is disposed in the example shaft apertures 412A, 412B and defines the example second rotational axis 218.

At block 806, the example pivot body 412 of FIG. 3 is placed between the first and second support walls 308A, 308B. For example, the longitudinal shaft 306 is disposed in the pivot body 214 between the first and second support walls 308A, 308B, such that the pivot body 214 can rotate about the second rotational axis 218.

At block 808, the example first torsional spring 216A of FIG. 3 is placed between the first support wall 308A and the pivot body 214. For example, a first portion of the first torsional spring 216A is disposed in the example first spring aperture 414A of the first support wall 308A and a second portion of the first torsional spring 216 is disposed in the example first block aperture 618A in the pivot body 214.

At block 810, the example second torsional spring 216B of FIG. 3 is placed between the second support wall 308B and the pivot body 214. For example, a first portion of the second torsional spring 216B is disposed in the example second spring aperture 414B of the second support wall 308B and a second portion of the second torsional spring 216B is disposed in the example second block aperture 618B in the pivot body 214.

Figure 9:
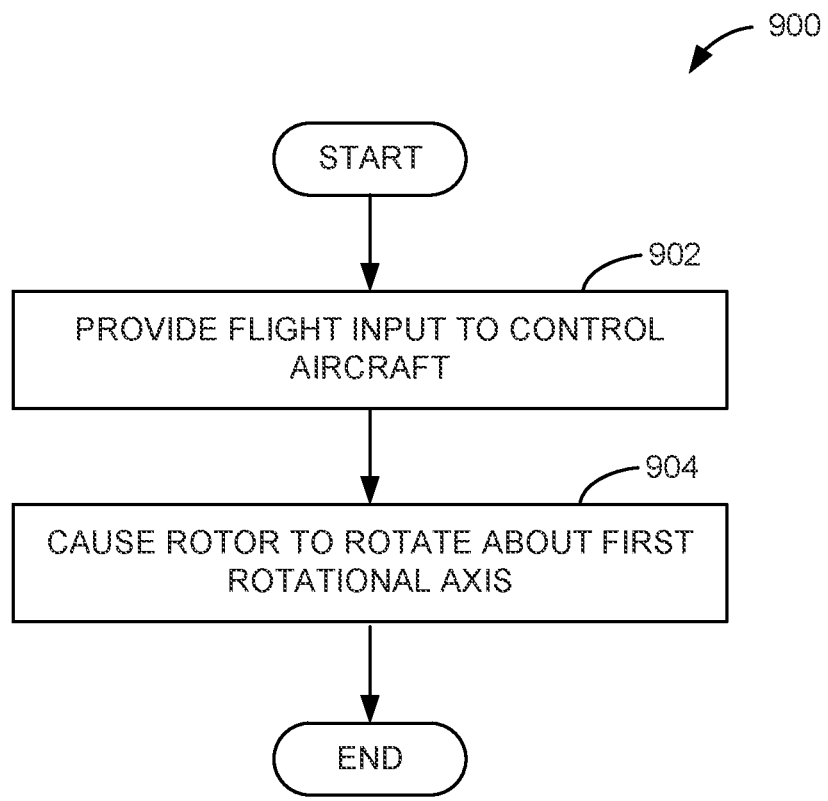
FIG. 9 is a flowchart representative of an example method to operate examples disclosed herein.

FIG. 9 is a flowchart representative of an example method 900 to operate examples disclosed herein. The example method 900 can be performed to operate the spring-integrated rotor 200 shown in FIGS. 2 and 3. The example method 900 begins at block 902, at which a flight input is used to control the aircraft 100 of FIG. 1. For example, an operator of the aircraft 100 provides the flight input via a control system in a cockpit of the aircraft 100.

At block 904, the spring-integrated rotor 200 rotates about a first rotational axis 210 based on the flight input. For example, operation of the example motor 208 of FIG. 3 causes corresponding rotation of the bracket 212, pivot body 214, and the hub 202 of FIGS. 2 and 3 about the first rotational axis 210.

Figure 10:
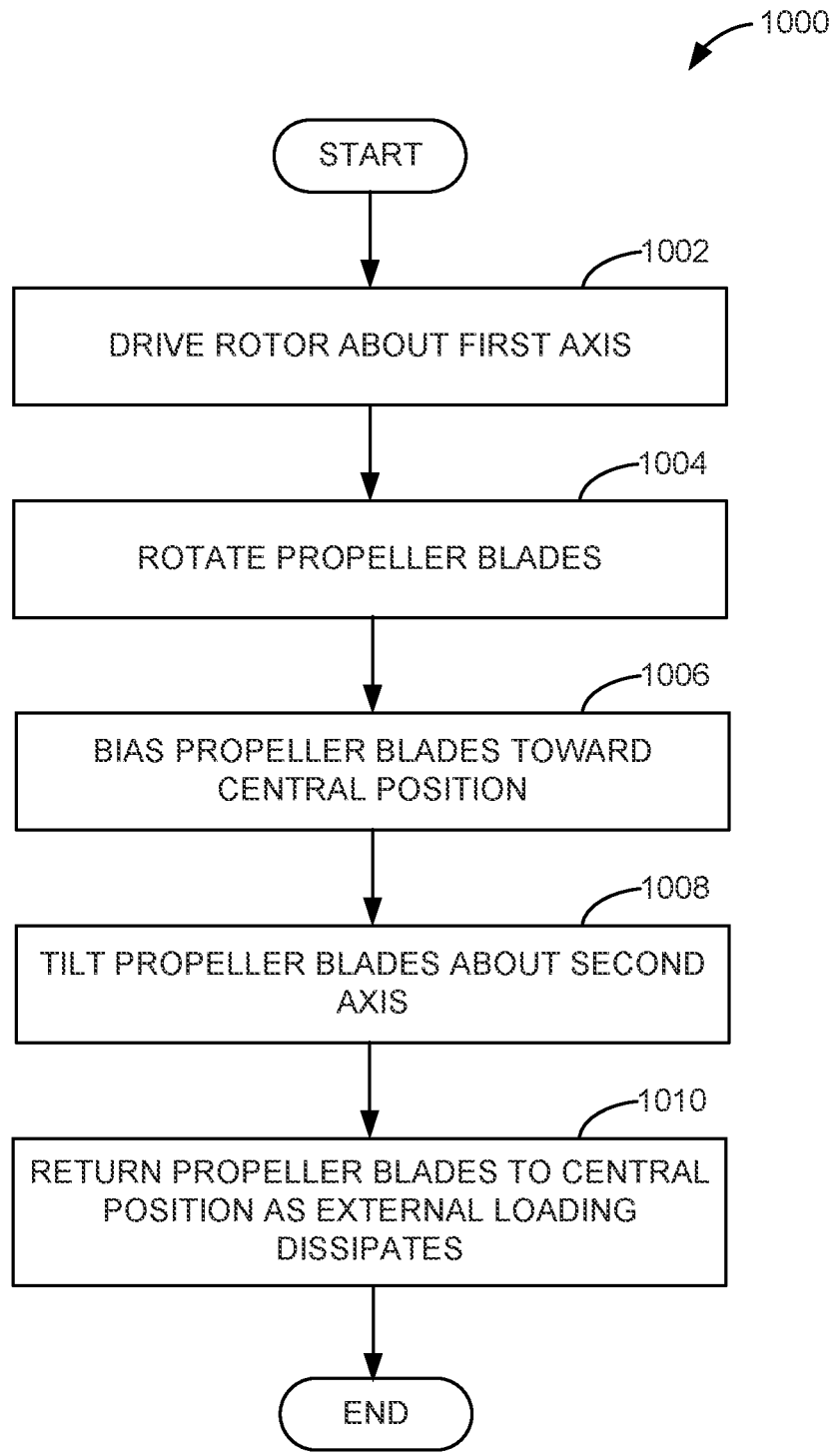
FIG. 10 is a flowchart representative of an example method for reducing loading on propeller blades of a rotor-driven vehicle.

FIG. 10 is a flowchart representative of an example method 1000 for reducing loading on propeller blades of a rotor-driven vehicle. The example method 1000 can be performed to reduce loading on the example propeller blades 204, 206 of FIG. 2 of the example rotors 108 of the aircraft 100 of FIG. 1. The example method 1000 begins at block 1002, at which the example spring-integrated rotor 200 shown in FIGS. 2 and 3 is rotated about the first example rotational axis 210 via the example motor 208.

At block 1004, the example propeller blades 204, 206 are rotated via the motor 208. For example, rotation of the motor 208 causes corresponding rotation of the propeller blades 204, 206 about the first rotational axis 210.

At block 1006, the example propeller blades 204, 206 are biased toward the central position. For example, the propeller blades 204, 206 are biased to the central position shown in FIG. 2 by the example first and second torsional springs 216A, 216B.

At block 1008, the example propeller blades 204, 206 are tilted about the example second rotational axis 218. For example, the propeller blades 204, 206 are tilted about the second rotational axis 218 in response to external loading imparted on the propeller blades 204, 206 during flight of the aircraft 100 of FIG. 1.

At block 1010, the example propeller blades 204, 206 return to the central position as external loading dissipates. For example, the first and second torsional springs 216A, 216B reduce and/or dissipate the external loading on the propeller blades 204, 206 to cause the propeller blades 204, 206 to return to the central position of FIG. 2.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus and articles of manufacture have been disclosed that reduce vibratory loads on a rotor. Advantageously, the disclosed methods, apparatus and articles of manufacture reduce a possibility of damage to the rotor when resonance occurs.

Example 1 includes an apparatus including a bracket defining a first rotational axis and coupled to a motor for rotating the bracket about the first rotational axis, a pivot body defining a second rotational axis extending along a direction different than the first rotational axis, the pivot body coupled to the bracket for rotation about the second rotational axis, and at least one spring device disposed between the bracket and the pivot body for urging the pivot body toward a central position when the bracket is rotating.

Example 2 includes the apparatus of Example 1, where the pivot body presents a top surface, and further including a rotor hub presenting an upper surface, the rotor hub tiltably coupled to the pivot body for defining a delta-3 angle between the upper surface of the rotor hub and the top surface of the pivot body, and a plurality of pins disposed between the pivot body and the rotor hub for adjusting the delta-3 angle.

Example 3 includes the apparatus of Example 2, where the pivot body further defines first openings and second openings within the top surface of the pivot body, the pins selectively disposed in either the first openings or the second openings for adjusting the delta-3 angle.

Example 4 includes the apparatus of Example 3, where the first openings are oriented in a first direction relative to the top surface of the pivot body, and the second openings oriented in a second direction relative to the top surface of the pivot body, the first direction different from the second direction.

Example 5 includes the apparatus of Example 4, where the delta-3 angle is further defined as a first delta-3 angle when the pins are inserted into the first openings, and as a second delta-3 angle, different than the first delta-3 angle, when the pins are inserted into the second openings.

Example 6 includes the apparatus of Example 1, where the bracket includes a base having first and second support surfaces extending therefrom, and the apparatus further including a shaft extending between the first and second support surfaces of the bracket along the second rotational axis.

Example 7 includes the apparatus of Example 6, where the shaft is a first shaft, and the apparatus further including a second shaft disposed in the pivot body along the first rotational axis, the second shaft intersecting and perpendicular to the first shaft.

Example 8 includes the apparatus of Example 7, where the at least one spring device is further defined as a first spring extending between the first support surface and the pivot body, and a second spring extending between the second support surface and the pivot body.

Example 9 includes the apparatus of Example 8, where the first and second springs are each in tension when the pivot body rotates about the second rotational axis, the first and second springs to bias the pivot body toward the central position in which the pivot body is substantially normal to the base of the bracket.

Example 10 includes the apparatus of Example 1, where the at least one spring device is generally u-shaped, the at least one spring device including first and second bent portions and a straight portion extending therebetween.

Example 11 includes a method including providing a flight input to control an aircraft, and causing, based on the flight input, an apparatus and a rotor coupled to the apparatus to rotate together about a first rotational axis, the apparatus including a bracket operatively coupled to a motor of the aircraft, a pivot body rotationally coupled to the bracket and defining a second rotational axis extending in a direction different than the first rotational axis, and at least one spring device disposed between the bracket and the pivot body for urging the pivot body toward a central position about the second rotational axis when the apparatus is rotating.

Example 12 includes the method of Example 11, further including adjusting a delta-3 angle between the pivot body and a rotor hub by selectively inserting pins in openings of the pivot body, the rotor hub coupled to and rotatable with the pivot body.

Example 13 includes the method of Example 12, where the openings are further defined as first openings and second openings, and wherein the adjusting the delta-3 angle includes moving the pins from the first openings to the second openings, the first openings oriented along a first direction, the second openings oriented along a second direction different than the first direction.

Example 14 includes a method for reducing loading on propeller blades of a rotor-driven vehicle, the method including driving a rotor of the rotor-driven vehicle about a first axis via a motor, rotating the propeller blades in response to driving the motor, biasing the propeller blades toward a central position relative to the first axis, in response to external loading imparted during flight, tilting the propeller blades about a second axis as the propeller blades rotate about the first axis, the second axis extending in a direction different than the first axis, and returning the propeller blades to the central position as the external loading dissipates.

Example 15 includes the method of Example 14, further including reducing deflection of the rotor by adjusting a delta-3 angle defined between an upper surface of a rotor hub of the rotor and a top surface of a pivot body of the rotor.

Example 16 includes the method of Example 15, where the adjusting the delta-3 angle includes moving pins from first openings defined by the pivot body to second openings defined by the pivot body, the first openings oriented in a first direction, the second openings oriented in a second direction different from the first direction.

Example 17 includes the method of Example 14, further including dissipating the external loading via at least one spring device coupled to the rotor.

Example 18 includes the method of Example 17, where the returning the propeller blades to the central position includes rotating a pivot body of the rotor relative to a bracket of the rotor along the second axis, the at least one spring device coupled between the pivot body and the bracket.

Example 19 includes the method of Example 18, where the dissipating the external loading includes oscillating the pivot body relative to the bracket about the second axis.

Example 20 includes the method of Example 19, where the oscillating the pivot body relative to the bracket includes generating, via the at least one spring device, forces on the pivot body opposite and proportional to an angular displacement between the pivot body and the bracket.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:
1. An apparatus comprising:
a bracket defining a first rotational axis and coupled to a motor for rotating the bracket about the first rotational axis, the bracket including a base having first and second support surfaces extending therefrom;
a pivot body defining a second rotational axis extending along a direction different than the first rotational axis, the pivot body coupled to the bracket for rotation about the second rotational axis;
a shaft extending between the first and second support surfaces of the bracket along the second rotational axis; and at least one spring device disposed between the bracket and the pivot body for urging the pivot body toward a central position when the bracket is rotating.

2. The apparatus of claim 1, wherein the shaft is a first shaft, and the apparatus further including a second shaft disposed in the pivot body along the first rotational axis, the second shaft intersecting and perpendicular to the first shaft.

3. The apparatus of claim 2, wherein the at least one spring device is further defined as a first spring extending between the first support surface and the pivot body, and a second spring extending between the second support surface and the pivot body.

4. The apparatus of claim 3, wherein the first and second springs are each in tension when the pivot body rotates about the second rotational axis, the first and second springs to bias the pivot body toward the central position in which the pivot body is substantially normal to the base of the bracket.

5. The apparatus of claim 1, wherein the at least one spring device is u-shaped, the at least one spring device including first and second bent portions and a straight portion extending therebetween.

6. The apparatus of claim 1, wherein the pivot body presents a top surface, and further including a rotor hub presenting an upper surface, the rotor hub tiltably coupled to the pivot body for defining a delta-3 angle between the upper surface of the rotor hub and the top surface of the pivot body, and
a plurality of pins disposed between the pivot body and the rotor hub for adjusting the delta-3 angle.

7. The apparatus of claim 6, wherein the pivot body further defines first openings and second openings within the top surface of the pivot body, the pins selectively disposed in either the first openings or the second openings for adjusting the delta-3 angle.

8. The apparatus of claim 7, wherein the first openings are oriented in a first direction relative to the top surface of the pivot body, and the second openings oriented in a second direction relative to the top surface of the pivot body, the first direction different from the second direction.

9. The apparatus of claim 8, wherein the delta-3 angle is further defined as a first delta-3 angle when the pins are inserted into the first openings, and as a second delta-3 angle, different than the first delta-3 angle, when the pins are inserted into the second openings.

10. An apparatus comprising:
a bracket defining a first rotational axis and coupled to a motor for rotating the bracket about the first rotational axis;
a pivot body defining a second rotational axis extending along a direction different than the first rotational axis, the pivot body coupled to the bracket for rotation about the second rotational axis, the pivot body presenting a top surface;
a rotor hub presenting an upper surface, the rotor hub tiltably coupled to the pivot body for defining a delta-3 angle between the upper surface of the rotor hub and the top surface of the pivot body;
a plurality of pins disposed between the pivot body and the rotor hub for adjusting the delta-3 angle; and
at least one spring device disposed between the bracket and the pivot body for urging the pivot body toward a central position when the bracket is rotating.

11. The apparatus of claim 10, wherein the pivot body further defines first openings and second openings within the top surface of the pivot body, the pins selectively disposed in either the first openings or the second openings for adjusting the delta-3 angle.

12. The apparatus of claim 11, wherein the first openings are oriented in a first direction relative to the top surface of the pivot body, and the second openings oriented in a second direction relative to the top surface of the pivot body, the first direction different from the second direction.

13. The apparatus of claim 12, wherein the delta-3 angle is further defined as a first delta-3 angle when the pins are inserted into the first openings, and as a second delta-3 angle, different than the first delta-3 angle, when the pins are inserted into the second openings.

14. The apparatus of claim 10, wherein the at least one spring device is u-shaped, the at least one spring device including first and second bent portions and a straight portion extending therebetween.

15. The apparatus of claim 10, wherein the at least one spring device includes first and second bent portions, the at least one spring device being curved between the first and second bent portions.

16. An apparatus comprising:
a bracket defining a first rotational axis and coupled to a motor for rotating the bracket about the first rotational axis;
a pivot body defining a second rotational axis extending along a direction different than the first rotational axis, the pivot body coupled to the bracket for rotation about the second rotational axis; and
at least one spring device disposed between the bracket and the pivot body for urging the pivot body toward a central position when the bracket is rotating, wherein the at least one spring device is u-shaped, the at least one spring device including first and second bent portions and a straight portion extending therebetween.

17. The apparatus of claim 16, wherein the pivot body is at least partially composed of polyether ether ketone, and the at least one spring device is at least partially composed of steel.

18. The apparatus of claim 16, further including at least one cotter pin disposed at an end of the at least one spring device.

19. A method comprising:
providing a flight input to control an aircraft;
causing, based on the flight input, an apparatus and a rotor coupled to the apparatus to rotate together about a first rotational axis, the apparatus including:
a bracket operatively coupled to a motor of the aircraft,
a pivot body rotationally coupled to the bracket and defining a second rotational axis extending in a direction different than the first rotational axis, and
at least one spring device disposed between the bracket and the pivot body for urging the pivot body toward a central position about the second rotational axis when the apparatus is rotating; and
adjusting a delta-3 angle between the pivot body and a rotor hub by selectively inserting pins in openings of the pivot body, the rotor hub coupled to and rotatable with the pivot body.

20. The method of claim 19, wherein the openings are further defined as first openings and second openings, and wherein the adjusting the delta-3 angle includes moving the pins from the first openings to the second openings, the first openings oriented along a first direction, the second openings oriented along a second direction different than the first direction.

* * * * *